United States Patent
Wong et al.

(10) Patent No.: US 11,010,257 B2
(45) Date of Patent: May 18, 2021

(54) MEMORY EFFICIENT PERFECT HASHING FOR LARGE RECORDS

(71) Applicant: EMC IP Holding Company LLC, Hopkinton, MA (US)

(72) Inventors: Tony Wong, Milpitas, CA (US); Hemanth Satyanarayana, Santa Clara, CA (US); Abhinav Duggal, Milpitas, CA (US); Ranganathan Dhathri Purohith, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 264 days.

(21) Appl. No.: 16/159,331

(22) Filed: Oct. 12, 2018

(65) Prior Publication Data
US 2020/0117546 A1 Apr. 16, 2020

(51) Int. Cl.
| | |
|---|---|
| *G06F 7/00* | (2006.01) |
| *G06F 17/00* | (2019.01) |
| *G06F 11/14* | (2006.01) |
| *G06F 16/13* | (2019.01) |
| *G06F 16/174* | (2019.01) |
| *G06F 16/901* | (2019.01) |

(52) U.S. Cl.
CPC ........ *G06F 11/1453* (2013.01); *G06F 16/137* (2019.01); *G06F 16/1748* (2019.01); *G06F 16/9027* (2019.01)

(58) Field of Classification Search
None
See application file for complete search history.

(56) References Cited

U.S. PATENT DOCUMENTS

| | | | |
|---|---|---|---|
| 2014/0372616 A1* | 12/2014 | Arisoylu | H04L 67/1029 709/226 |
| 2015/0067283 A1* | 3/2015 | Basu | G06F 3/0641 711/162 |
| 2017/0070521 A1* | 3/2017 | Bailey | G06F 16/285 |
| 2017/0255708 A1* | 9/2017 | Cho | G06F 16/22 |
| 2017/0255709 A1* | 9/2017 | Cho | G06F 16/9024 |

* cited by examiner

*Primary Examiner* — Tuan A Pham
(74) *Attorney, Agent, or Firm* — Staniford Tomita LLP (57) ABSTRACT

Embodiments for a memory efficient perfect hashing for large records. A container ID set is divided into multiple fixed range sizes. These ranges are then mapped into perfect hash buckets until each bucket is filled to uniformly distribute the container IDs across different perfect hash buckets so that the number of CIDs in every perfect hash bucket is the same or nearly the same. Individual perfect hash functions are created for each perfect hash bucket. With container IDs as keys, the process maps n keys to n positions to reduce any extra memory overhead. The perfect hash function is implemented using a compress, hash, displace (CHD) algorithm using two levels of hash functions. The level 1 hash functions divides the keys into multiple internal buckets with a defined average number of keys per bucket. The CHD algorithm iteratively tries different level 2 hash variables to achieve collision-free mapping.

14 Claims, 8 Drawing Sheets

MEMORY EFFICIENT PERFECT HASHING FOR LARGE RECORDS

TECHNICAL FIELD

This invention relates generally to data storage, and more particularly to systems and methods for memory efficient perfect hashing for large data records.

BACKGROUND OF THE INVENTION

In data storage systems, a dictionary is a general-purpose data structure for storing a group of objects. A dictionary has a set of keys, each of which is associated with a single associated value. When presented with a key, the dictionary will return the associated value. A dictionary is thus a key-value store and is typically implemented as a hash table, so it is also often called a hash or a map (or a hashmap). The keys in a dictionary must be unique and are usually simple data types integers or strings), while the values can be of any type.

Many applications in large-scale deduplication backup systems, such as the EMC Data Domain File System, need a dictionary data structure based out of container identifier (ID) or container/region IDs or the SHA1 (secure hash algorithm 1) fingerprint that is capable of storing billions of entries. The main requirement of the data structure is the ability to store large-sized values with very minimal memory overhead and still be able to do lookups in a fast and consistent time.

Traditional dictionary implementations, such as hash tables, require the keys themselves to be stored along with the values. Using hash-tables for all the container IDs (e.g., 8-bytes) or fingerprints (e.g., 24-bytes) in a Data Domain system is generally not feasible since the overhead in storing the keys is very high.

What is needed, therefore, is a dictionary data-structure with minimal memory overhead, such as by using perfect hash functions in place of hash-tables to significantly reduce the memory overhead.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a dictionary data-structure based on container IDs that use perfect hash functions in place of hash-tables to significantly reduce the memory overhead, such as by more than ten times the amount required in present hash table implementations.

Figure 1:
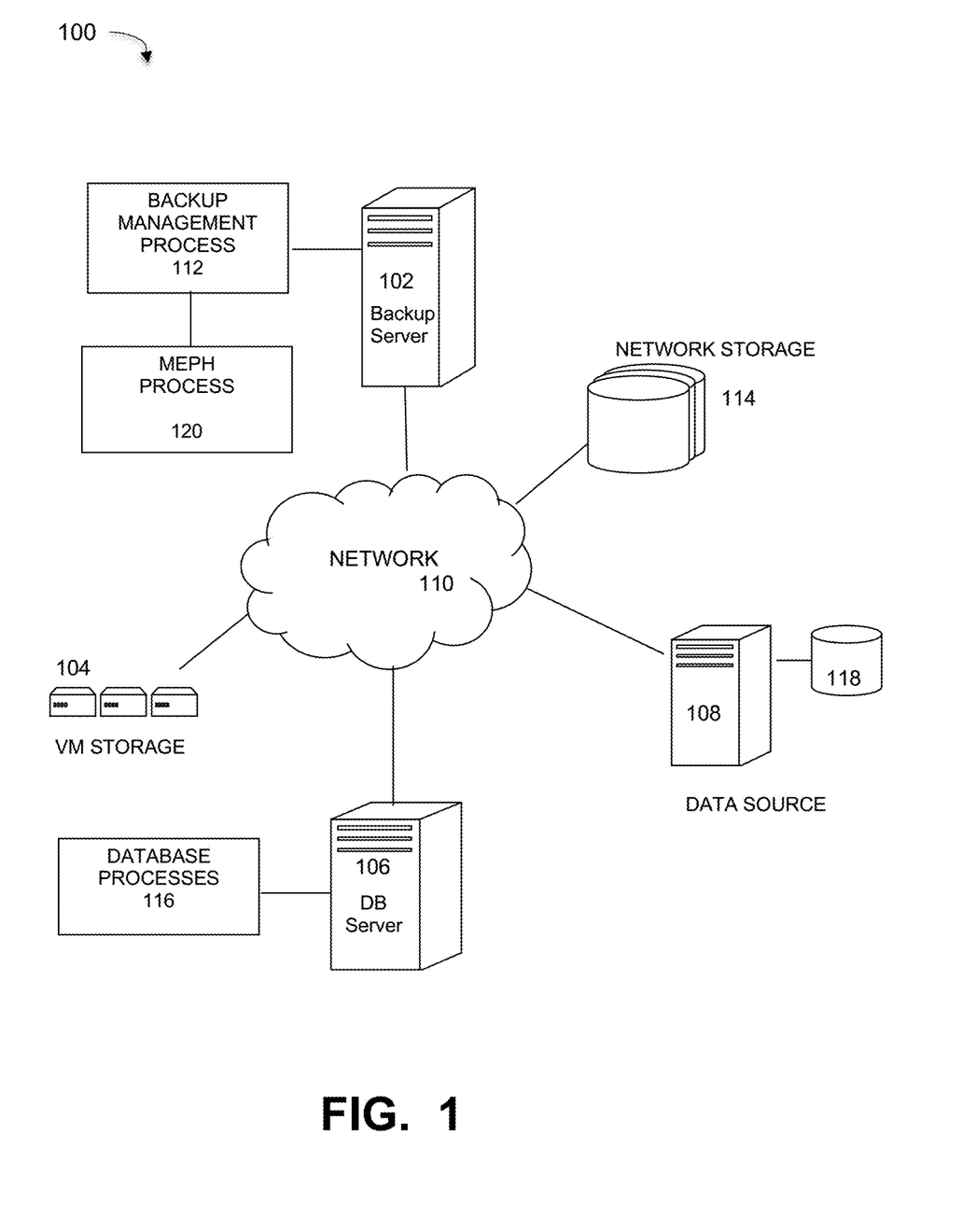
FIG. 1 illustrates a computer network system that implements one or more embodiments of a large-scale network implementing a memory efficient perfect hashing process for large records.

FIG. 1 illustrates a computer network system that implements one or more embodiments of a large-scale network implementing a memory efficient perfect hashing process for large records. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) representing a physical or virtual network of many virtual machines. The VMs or other network storage devices serve as target storage devices for data backed up from one or more data sources, such as computer 108, which may have attached local storage 118 or utilize networked accessed storage devices 114.

The network server computers are coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage 114.

The data sourced by the data source 108 may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) which uses tables to store the information. A separate computer 106 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

In an embodiment, system 100 may represent a Data Domain Restorer (DDR)-based deduplication storage system, and storage or backup server 102 may be implemented as a DDR Deduplication Storage server provided by EMC Corporation that provides a platform for data backup, archiving, and disaster recover. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery. MEPH for Garbage Collection Processing As shown in FIG. 1, system 100 includes a memory efficient perfect hashing process (MEPH) 120 associated with or executed as part of the backup management process 112. With reference to the backup system of FIG. 1, or similar backup systems, process 120 uses perfect hash functions instead of hash tables in the dictionary data structure to reduce the memory overhead required to store the key-value pairs. An embodiment of process 120 uses a data-structure based on container IDs using perfect hash functions. The key-set should be static in order to use perfect hash functions. Perfect hash functions give a collision free mapping for a given set of keys. The main idea behind perfect hash functions is to try out different hash functions until the process obtains a collision-free mapping for the given set of keys. Thus, there is a cost associated with creation of perfect hash functions. Minimal perfect hash functions map a set of n keys to n positions. Finding a minimal perfect hash function requires a high number of trial runs and thus takes a longer time for creation. If instead, there are n keys and m positions to map to (where m>n), the number of trials to find a collision free mapping is reduced, along with the time required to create perfect hash functions. There is thus a trade-off between memory usage and creation time for perfect hash functions.

Examples of the memory efficient perfect hashing process 120 are described in relation to garbage collection applications, though embodiments are not so limited. Current garbage collection (GC) processes use perfect hash functions with fingerprints to track the live segments in the system. A general garbage collection (GC) procedure can be summarized as follows in terms of steps it performs: (1) enumeration: identify all the live segments; (2) filter: remove duplicate segments and preserve the one with highest container ID; (3) select: compute the liveness of each container and determine the cutoff liveness percentage; and (4) copy: copy forward the live segments from the selected containers.

Figure 2:
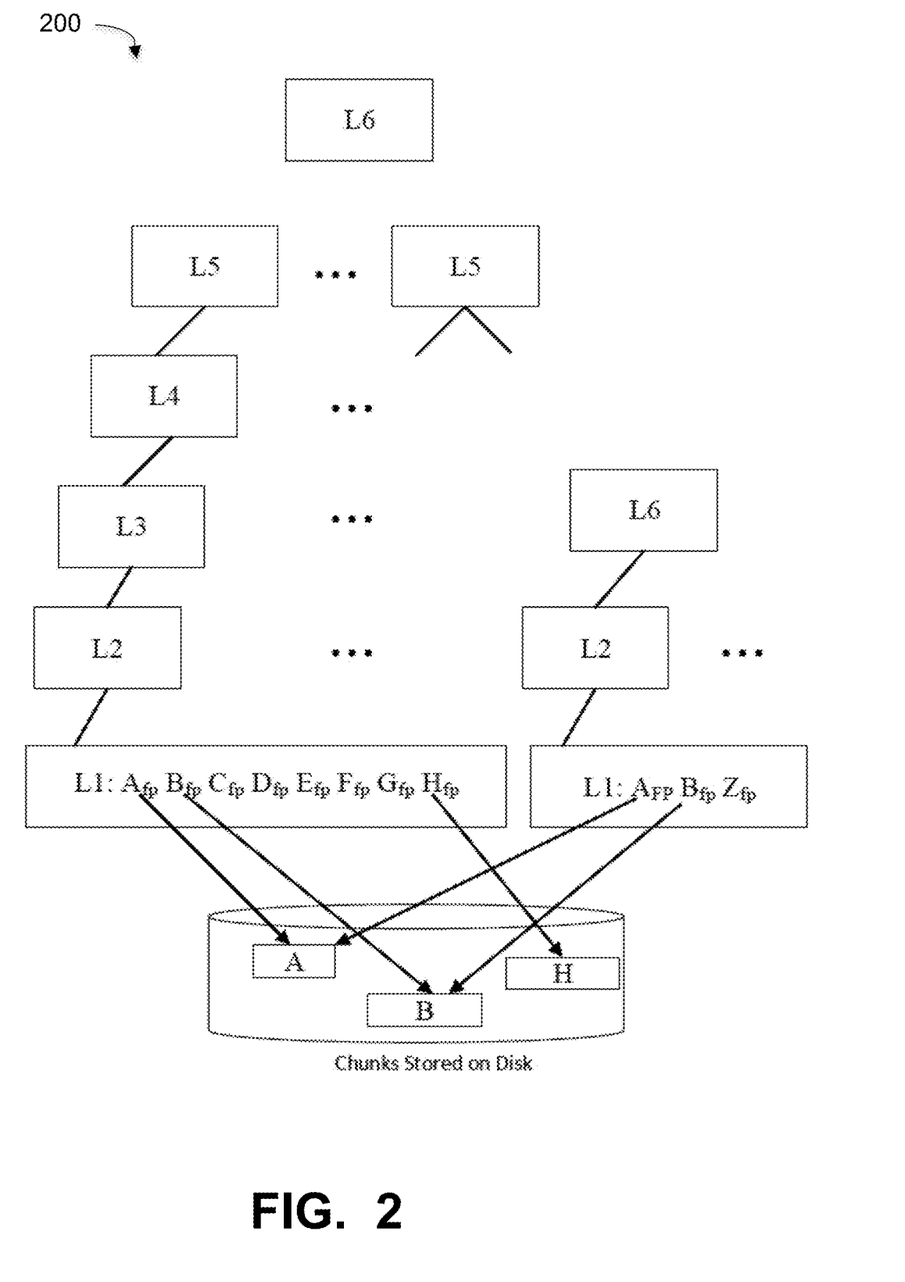
FIG. 2 shows a typical file tree representation for a garbage collection process in deduplicated storage.

FIG. 2 shows a typical file tree representation for a garbage collection process in deduplicated storage. The chunks directly written by users are represented as L0, meaning the lowest level of the tree. Consecutive L0 chunks are referenced with an array of fingerprints by an L1 chunk, and an array of L1 fingerprints are referenced by an L2 chunk. This continues up to the top of the tree that is labeled L6 for consistency, even if the file is small enough not to need intermediate nodes such as the example on the right side of the figure. The L1-L6 chunks are referred to as LP chunks, where P is a parameter that ranges from 1 to 6 and indicates meta data representing the file. Representing a file in a tree structure of fingerprints covering the lower layers of the tree is often called a Merkle tree. Deduplication takes place because a chunk can be referenced multiple times such as chunks A and B in the example. Though not shown in FIG. 2, LP chunks are themselves stored on disk in containers.

As an example, consider a system with 100 TB of capacity, 10 times deduplication ratio (logical capacity divided by physical capacity), 8 KB L0 chunks, and 20-byte fingerprints. The logical capacity is 1 PB, and since each 8 KB logically written by a client requires a 20-byte fingerprint stored in an L1, the L1 chunks are 2.5 TB, though the upper levels of the tree are smaller. This example highlights that the mark phase cannot be fully performed in memory, as the L1 references should be read from disk. In an embodiment, the system 100 container format includes a metadata section with a list of fingerprints for the chunks within the container. The metadata region is relatively small (a few hundred KB) and can be read more quickly than the full container With reference to FIG. 2, the L0 segments represent user data and are the leaves of the tree. The L6 is the root of the segment tree. Segments from L1 to L6 are referred to as metadata segments or LP segments. They represent the metadata of a file associated with a file tree. An L1 segment is an array of L0 references. Similarly an L2 is an array of L1 references and so on. A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager may be used that is responsible to maintain the log-structured container set and provide a mapping from container identifiers (CID) to block offset on disk. This mapping is entirely stored in memory. The garbage collection process of the file system is responsible for enumerating all live segments in the live content handles of the file system. In a conventional logical enumeration algorithm, which is a depth-first traversal of all the file trees, each file tree is entirely traversed within a single context so that it is possible to roll a checksum from the L0 segments toward the root of the tree and validate the checksum every time a file tree is traversed. In a physical garbage collection process, the enumeration algorithm carries out a breadth-first traversal of all the files in the file system.

Figure 3:
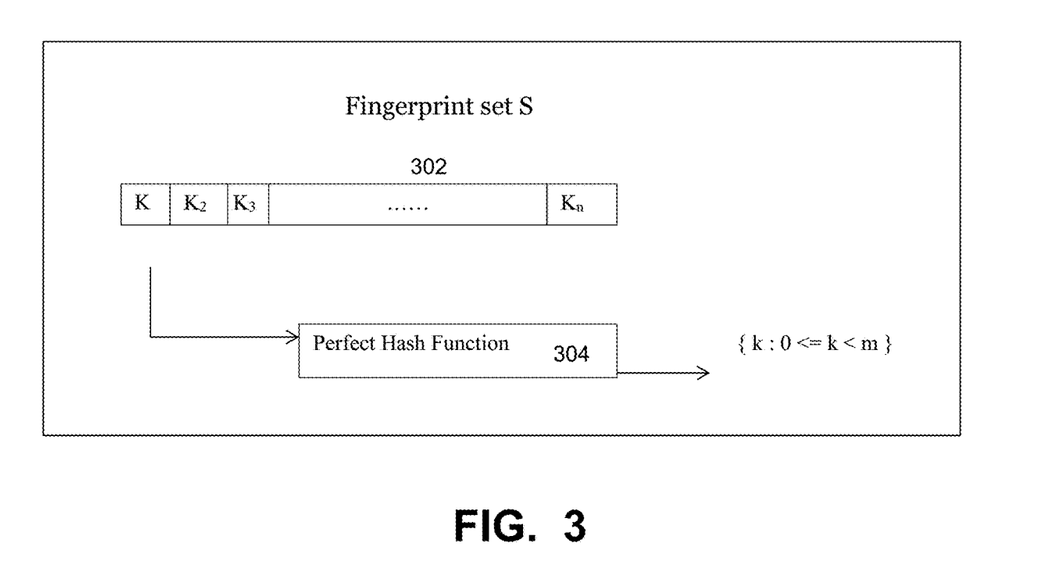
FIG. 3 illustrates a perfect hash function for a fingerprint set that can be used in conjunction with certain embodiments.

In general, a perfect hash function is a collision-free hash function that maps a set of keys of size n to a range of size m where m>n (m=1.43*n). For example, it only requires 2.8 bits per key in a Data Domain implementation, and is thus is much more compact than the Bloom filter, which requires 6 bits per fingerprint. However use of the perfect hash vector requires that the hash function should be pre-computed using the entire set of keys first and any key not in the initial set can cause a collision. FIG. 3 illustrates a perfect hash function 304 for a fingerprint set 302 that can be used in conjunction with certain embodiments. The perfect hash function phf( ) has the following representation:

$$phf(x) = (f(x) + a_{i(x)}h(x) + b_{i(x)}) \% m$$
$$i(x) = g(x) \% r$$

where f, g, h are uniform hash functions; r is the number of hash buckets in the perfect hash function and a, b are constants that depend on the bucket. The size of the function can be written as:

$$|PH_{vec}|=|PHF|+|Bit\ vector|$$

where |PHF| is the space required to store the per bucket constants.

Figure 4:
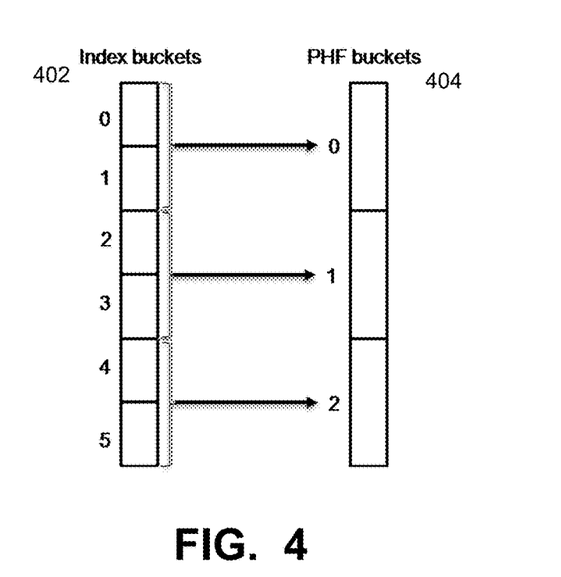
FIG. 4 illustrates a correlation of index buckets to PHF buckets, under an embodiment.

The index is further subdivided into multiple partitions such that all the fingerprints in each partition can fit in memory in order to build the perfect hash function for that subset of fingerprints. FIG. 4 illustrates a correlation of index buckets 402 to perfect hash function (PHF) buckets 404, under an embodiment. As shown in the simple example of FIG. 4, index buckets 0 and 1 are put in PHF bucket 0, index buckets 2 and 3 are put in PHF bucket 1, and index buckets 4 and 5 are put in PHF bucket 2.

Dictionaries can be implemented as hash tables or just perfect hash functions, and there are advantages and disadvantages associated with either method. For hash tables, there is no creation time, but they are not suitable for keys with large size. They also require a lot of memory to store the keys. For example, in order to store a 2-byte value for a container, storing the container ID in the hash table itself takes up 8-bytes per key. Thus the memory overhead is at least four times the value size for every key. Hence, hash tables are not suitable for storing large numbers of keys. Perfect hash functions eliminate the memory overhead of storing keys. However, to store large sized values this method incurs an overhead in terms of extra positions required for values. Also, current implementations are not very flexible, in that they can work only with fingerprints and are tied to garbage collection processes. The memory efficient perfect hashing process 120 eliminates the extra overhead for values and makes it a generic library to be used by others in the data storage system (e.g., DDFS). However, the MEPH process 120 uses the underlying logic of creating perfect hash functions for every bucket.

Figure 5:
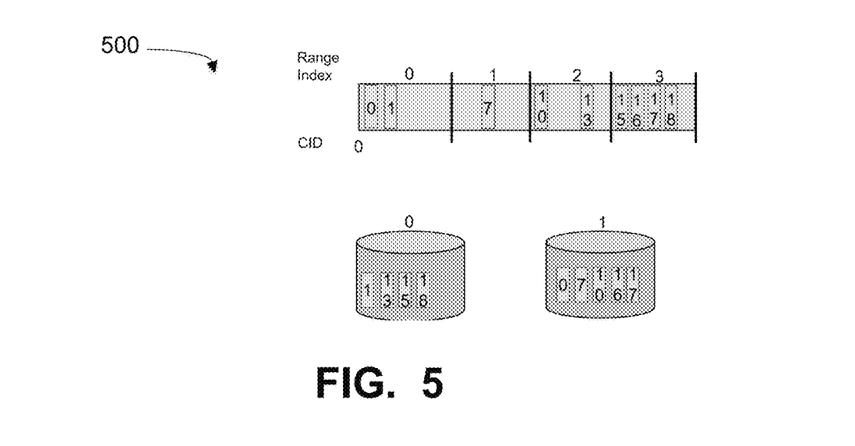
FIG. 5 shows a division for a perfect hash bucket 0 in an example implementation.

In an embodiment, the creation of a perfect hash function uses a compress, hash, and displace (CHD) algorithm. The CHD algorithm uses two levels of hash functions. The level-1 hash function divides the keys into multiple internal buckets. The average number of keys per bucket is chosen as 7 and thus if there are n keys in the perfect hash bucket, there will be n/7 internal buckets. The level-1 hash function tries to uniformly distribute these keys in to these internal buckets. FIG. 5 shows this division for a perfect hash bucket 0 in an example implementation. For this example diagram 500, in a first step, the level one hash maps keys into 'r' internal buckets, denoted "0" and "1" in the diagram. In an example, r is assigned to be r=2, and h0 is the level one hash function chosen such that roughly the same number of keys are mapped to every bucket. For the mapping, the internal bucket is assigned as follows: internal bucket=h0(key)%2. As mentioned above, the perfect hash function maps to m positions for n keys. In one embodiment, the process uses a load factor of 0.7. Thus m=1.43*n is called the phf range. The level-2 hash is defined as ((h1+h2)*d0+d1)%phf_range. The goal is to find the proper values of h1, h2, d0 and d1 to get a collision free mapping. This is done by trying out different values of h1, h2, d0 and d1 for all the internal buckets and applying the function to all the keys in the internal bucket to get a collision free mapping. Once the collision free mapping is obtained, the hash functions h1 and h2 are stored in the bucket descriptor and d0 and d1 are stored in a compressed form as d0+d1*phf_range. The algorithm for this process is expressed as follows.

The h1 and h2 values are numbers generated from the key itself and some random seeds for the entire (bigger) perfect hash vector bucket (and not the small ones that contain 7 keys). The d0, d1 values are the displacement values for each small internal bucket (i.e., with the 7 keys). The random seeds are kept in the bigger bucket header for all the keys. When the process computes the position for a given key, it will compute the h1 and h2 values from the random seeds saved in the bucket header and the key, then hash the key into the internal small buckets (the hash function is also kept in the big bucket header), then lookup the displacement value for that small bucket. This provides all of the above h1, h2, d0, d1 values, which are the used to compute the position of the hash, as described in the algorithm below.

Algorithm 1: Keep trying for different values of d0, d1, h1 and h2 until the process gets a collision free mapping. For every bucket processed in the same order as in step 2:

```
Initialize d0 = 0 and d1 = 0
For every key in bucket:
    Compute pos = ((h1+h2)*d0 + d1) %phf_range.
    If pos is unused in bitmap, mark pos as used.
    else try again with different d0, d1, h1 and h2
    until it finds a collision free mapping.
Save the value (d0 + d1 * phf_range). The values of h1,
h2 are not chosen directly. The process selects some
random numbers for all the keys and uses these random
numbers and the key to generate h1 and h2.
```

The process uses 10-bits to store the value (d0+ d1*phf_range) for every internal bucket. Since the average number of keys per bucket is considered as 7, it requires about 10/7=1.43 bits per key to store the function. The lookup happens similarly. The process gets the function corresponding to the key by the offset stored in the bucket descriptor and apply this function to get the position.

In an embodiment of the MEPH process 120, every fingerprint has one or two bits associated with it, to track if the segment represented by it is live or dead. As described above, this implementation uses a load factor of 0.7, that is, n keys are mapped to m positions where m=1.43n. The load factor of 0.7 is chosen to have a balance between the creation time and the memory required while storing one bit per key. However, this implementation is specific to fingerprints and is not necessarily used with container IDs as keys. Also, for the use cases with container IDs as keys, the value stored is more than one bit per key. When the size of the value increases, the extra 40% positions incur overhead in the memory required. Embodiments of process 120 reduce this extra overhead and develop a data-structure using perfect hash functions that maps n keys to the same number of positions, that is n keys to n positions. In some cases, memory accesses may increase as (in an example) perfect hash functions for fingerprints take four random memory accesses for lookup, whereas the memory efficient perfect hashing process 120 takes a maximum of six random accesses for a lookup. In general, the memory efficiency depends only on the size of the value, and the size of the key has no effect.

The memory efficient perfect hashing process 120 uses perfect hash functions underneath. However, creating a single perfect hash function for all the container IDs (CIDs) in the container set (C-set) is not feasible as it requires huge buffers to pass through millions of keys. To overcome this, process 120 divides the C-set into multiple fixed size ranges and maps these ranges into multiple perfect hash buckets. Multiple CID ranges are mapped to the same perfect hash bucket until the bucket is filled. This mapping policy ensures that the CIDs are uniformly distributed across different perfect hash buckets, i.e., the number of CIDs in every perfect hash bucket is almost same. Uniform distribution of CIDs optimizes the number of perfect hash buckets needed and thus the memory required in terms of bucket descriptors and other headers. Once the CID ranges are mapped to multiple buckets, perfect hash functions are created for every bucket.

Figure 6:
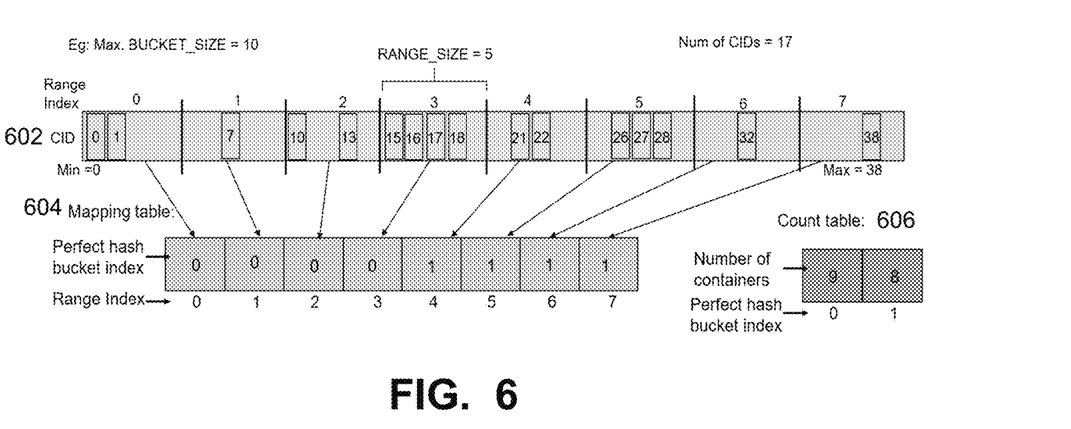
FIG. 6 is a diagram that illustrates the mapping of container IDs to multiple buckets, under some embodiments.

FIG. 6 is a diagram that illustrates the mapping of container IDs of container ID set 602 to multiple buckets, under some embodiments. As shown in the example of FIG. 6, the fixed size of the range is 5 and max bucket size is 10. Ranges 0 to 3 are mapped to perfect hash bucket 0 since the total number of CIDs in ranges 0-3 is 9 (2+1+2+4). While adding the $4^{th}$ range that has 2 containers, perfect hash bucket 0 exceeds its maximum size of 10 and thus the $4^{th}$ index is mapped in mapping table 604 to perfect hash bucket 1 and so on. Once all the CID ranges are mapped to perfect hash buckets, a perfect hash function is individually created for all perfect hash buckets. In an embodiment, the creation of perfect hash function uses the same algorithm 1 that is implemented for fingerprints as described above.

Figure 7:
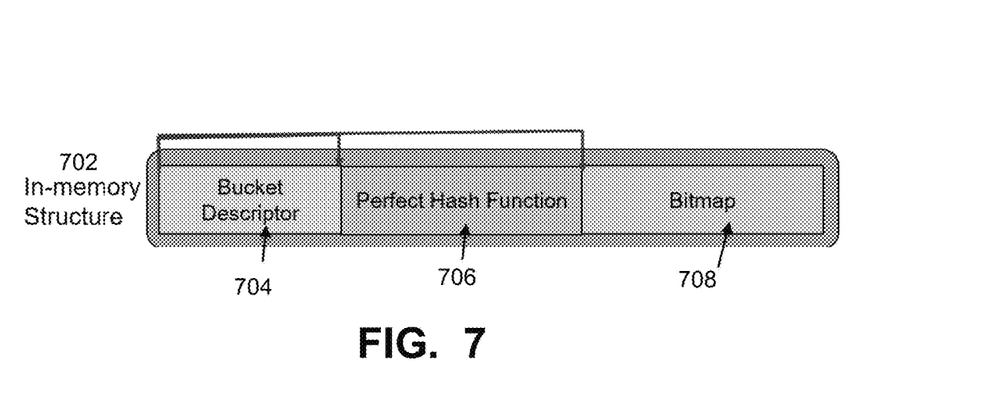
FIG. 7 illustrates an example memory layout of a memory efficient perfect hash after the perfect hash is created for all the buckets, under some embodiments.

FIG. 7 illustrates an example memory layout of a memory efficient perfect hash after the perfect hash is created for all the buckets, under some embodiments. As shown in FIG. 7, every bucket 702 is an in-memory data structure that has three types of information. Bucket descriptors 704 comprise the header for perfect hash buckets. The offset of the perfect hash function and the start bit of the bucket in the bitmap is stored in the descriptor. The perfect hash function 706 comprises the coefficients of the generated perfect hash function for every perfect hash bucket is stored here. Bitmap 708 comprises the collision free mapping as generated by perfect hash function for every perfect hash bucket.

Even using an existing algorithm (e.g., Algorithm 1 above) for perfect hash creation, the MEPH process is able to reduce memory usage by significant amounts (e.g., 40% less memory) since the process uses a load factor of 0.7 in the perfect hash algorithm to reduce the creation time (i.e., n keys in a perfect hash bucket are mapped to m=1.43n positions). The process uses a bitmap to store this mapping. It allocates m-bits (where m varies based on the number of keys in each bucket) for each perfect hash bucket, where each bit represents a position that the function can map to. Once it creates the perfect hash function, it iterates through the key-set and for every key to get a position from the perfect hash function and set the bit corresponding to the position returned by the function in the bitmap. Thus, the bitmap holds the mapping for all the keys as generated by the perfect hash. It should be noted that other perfect hash creations algorithms or proprietary methods (other than Algorithm 1) may also be used.

When a caller queries MEPH to get the position of a key in the C-set, the process first determines the position of the key as generated by the perfect hash function. In prior systems, this position is just returned, so the caller needs to allocate extra 40% memory to accommodate the extra positions returned by the perfect hash library. With the MEPH process 120, instead of returning this position, the process counts the number of bits set until this position in the bitmap and returns the count as maintained in count table 606. Since the number of bits set in the bitmap is always less than n for n keys, it always return less than n positions, thus reducing the extra 40% memory required to store the value.

Figure 8:
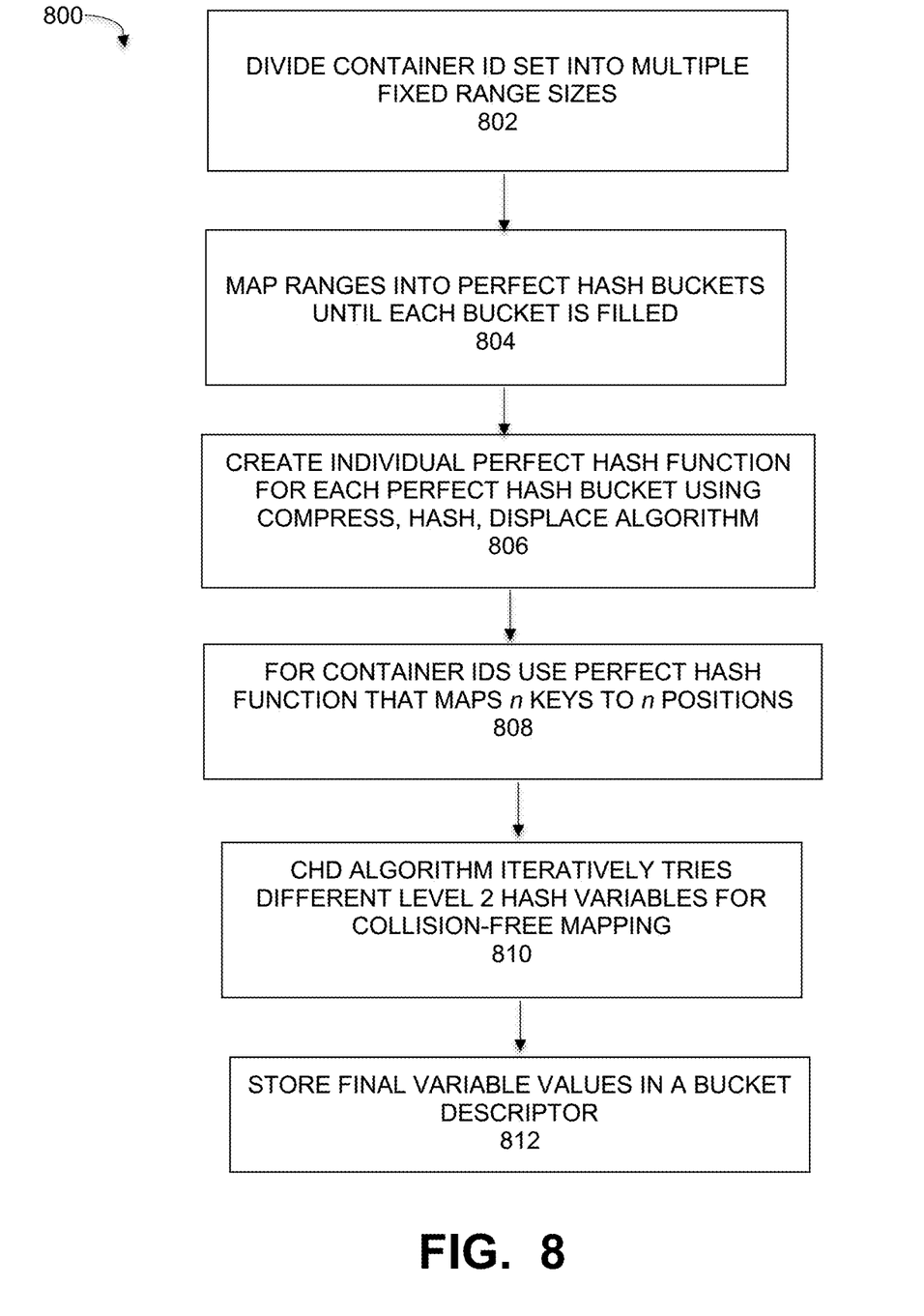
FIG. 8 is a flowchart that illustrates a method of performing a memory efficient perfect hashing process for large data sets, under some embodiments.

FIG. 8 is a flowchart that illustrates an overall method of performing a memory efficient perfect hashing process for large data sets, under some embodiments. As shown in FIG. 8, process 800 begins by dividing the container ID set into multiple fixed range sizes, block 802. This is shown in the example of FIG. 6 where the original CID 602 is divided into 8 ranges (0 to 7) of 5 buckets each. These ranges are then mapped into perfect hash buckets until each bucket is filled, block 804. This step uniformly distributes the container IDs across different perfect hash buckets so that the number of CIDs in every perfect hash bucket is the same or nearly the same. The process then creates individual perfect hash function for each perfect hash bucket, block 806. For the case of using container IDs as keys, the process maps n keys to n positions to reduce any extra memory overhead, block 808.

In an embodiment, the perfect hash function is implemented using the compress, hash, displace (CHD) algorithm using two levels of hash functions, for example. The level 1 hash functions divides the keys into multiple internal buckets with a defined average number of keys per bucket (e.g., 7 as in the example above). The CHD algorithm iteratively tries different level 2 hash variables (i.e., h1, h2, d0 and d1) to achieve collision-free mapping, block 812. The final variable values that produce the collision-free mapping are stored in a bucket descriptor, and the d0 and d1 values are stored in compressed form as d0+d1*phf_range, as shown in algorithm 1 above, block 812.

Figure 9:
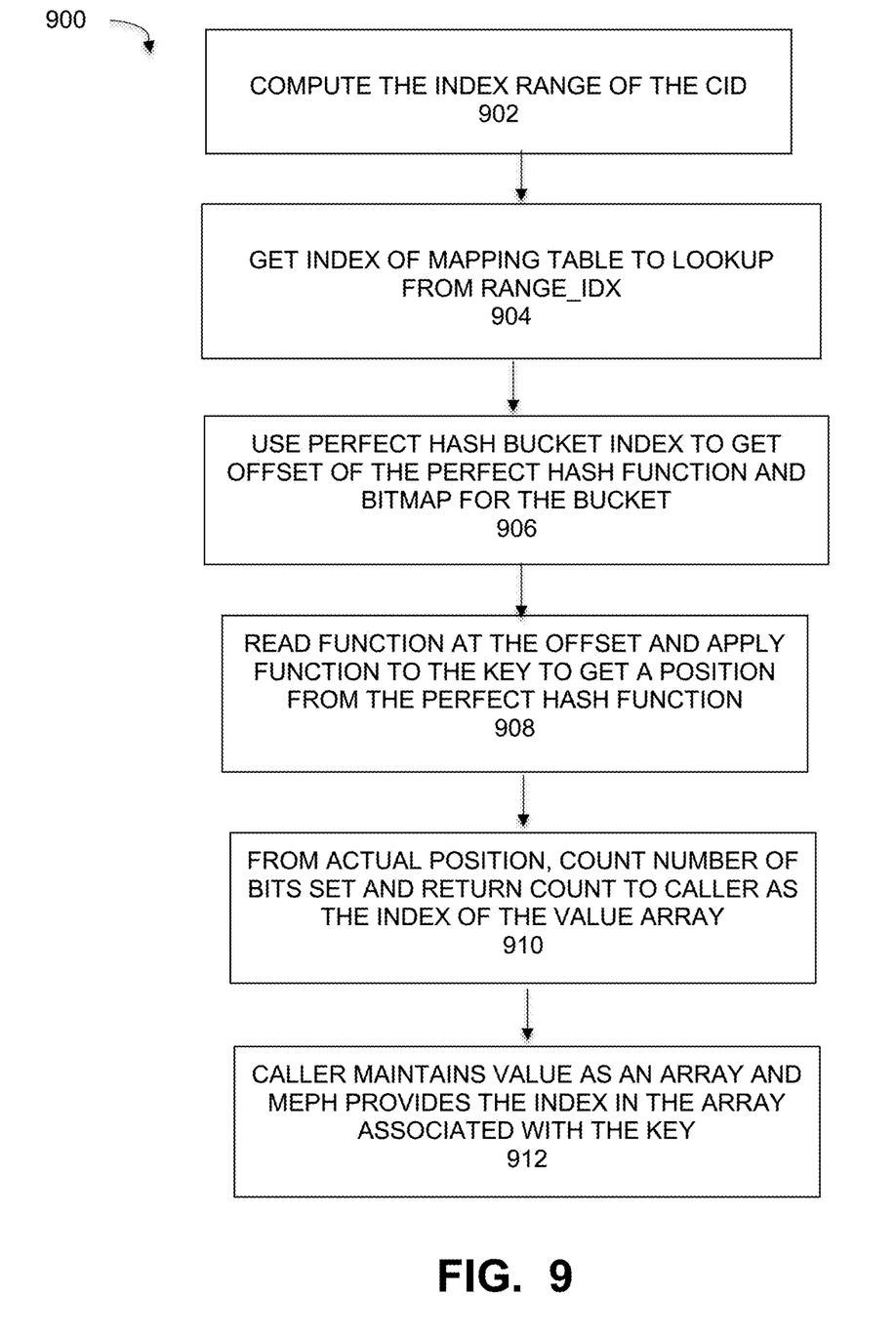
FIG. 9 is a flowchart that illustrates a method of returning a count to a caller as the index of a value array, under some embodiments.

FIG. 9 is a flowchart that illustrates a method of looking up a specific container ID using the MEPH process, under some embodiments. It essentially illustrates a method of returning a count to a caller as the index of a value array, as described with reference to examples illustrated in FIGS. 10A and 10B, below. In step 902, the range index of the container IDs is computed as Range_Index=(CID−min_CID)/Range_Size. In step 904, the index of the mapping table to lookup is given by the range index (range_idx) value. The value at range_idx in the mapping table gives the perfect hash bucket index. The process then uses the perfect hash bucket index to get the offset of the perfect hash function and the bitmap for the bucket, block 906. The process then reads the function at the offset specified in the bucket descriptor and applies the function to the key to get a position from the perfect hash function, block 908. This position is relative to the keys present in the current bucket. Hence, it adds the bit offset, which specifies the start-bit for the bucket to get the actual position in the bitmap. Once it gets the actual position, it counts the number of bits set until that position and returns the count to the caller as the index of the value array, block 910. The caller maintains the value as an array and the MEPH process provides the index in the array associated with the key, block 912.

Figure 10A:
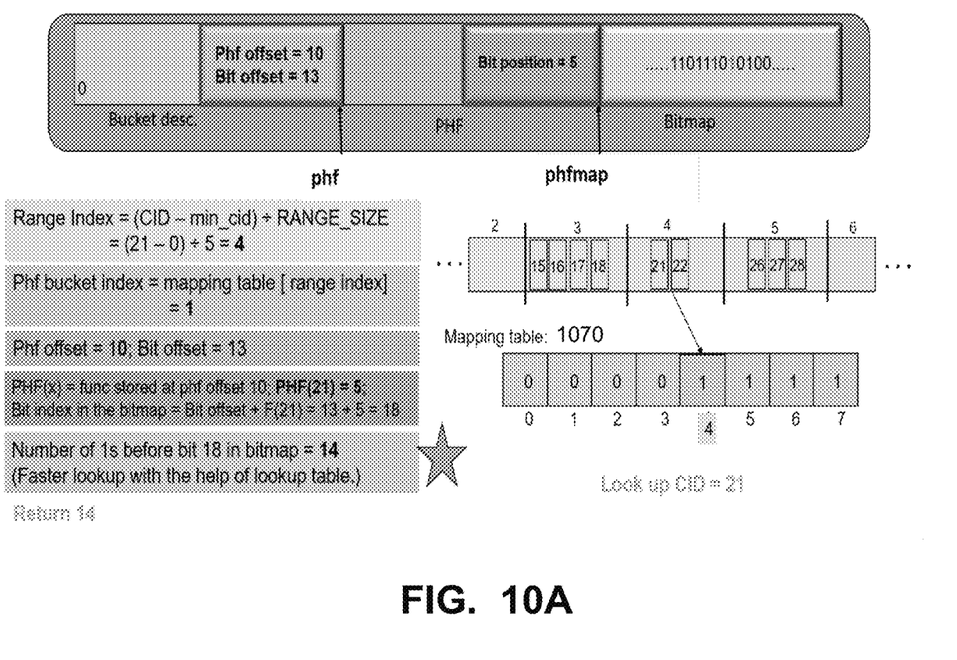
FIG. 10A illustrates the steps in a lookup of a certain CID under an example embodiment.

The process 900 shown in FIG. 9 is illustrated with reference to the example diagram of FIG. 10A, which shows the steps in a lookup of a certain container ID under an example embodiment. For this example, the container to be looked up has CID 21. In this example, it is assumed that a perfect hash function is created for two perfect hash buckets. As shown in FIG. 10A, first the range index of the CID is computed as (CID−min_cid)/RANGE_SIZE, which is 4 in case of CID 21, as shown. The range_idx gives the index of the mapping table 1070 to lookup. The value at range_idx in the mapping table gives the perfect hash bucket index. In this case, the range_idx=1. Once the process has the perfect hash bucket index, it can get the offset of the perfect hash function and bitmap for that bucket. For the example of FIG. 10A, the PHF offset=10 and the bit offset=13. The process then reads the function at the offset specified in the bucket descriptor and applies the function to the key to get a position from the perfect hash function. For the example of FIG. 10A, PHF(x)=5 (which is the function stored at PHF offset 10), and the bit index in the bitmap is 18 (which is the bit offset+F(12)=13+5). As shown in FIG. 9, the process counts the number of bits set until that position. Thus, for FIG. 10A, the number of 1s before bit 18 in the bitmap is 14. It should be noted that a faster lookup can be performed with the help of a lookup table. The process then returns the count to the caller as the index of the value array as shown in FIG. 10A. The caller maintains the value as an array and MEPH provides the index in the array associated with the key.

While FIG. 9 illustrates the process steps in a lookup of a certain container ID, FIG. 10A illustrates the return of a count to a caller as the index of a value array for the example of FIG. 9, under an embodiment. In FIG. 10A, the process already has set some parameters: min_cid=0, RANGE_SIZE=5. It is then looking up CID=21 to find its hash value. Recall that CID's are subdivided into many perfect hash vectors (PHVECs). This first level mapping is provided by MEPH as follows: compute CID range index= (CID−min_cid)/RANGE_SIZE=(21−0)/5=4. Then look up the mapping table entry #4 to find out the PHVEC# this CID is mapped into. In this case, mapping table #4=1 so it will be using PHVEC #1 to compute the hash value of CID 21. For PHVEC[1], the bit offset is 13, which means that the previous PHVEC functions has already occupied position 0 to 12 so PHVEC[1] starts at bit 13. Now apply the PHVEC [1]'s hash function for CID 21, to get a value 5. This means 5 bits relative to PHVEC[1]. Now add 13 back to this value to get the absolute bit position since PHVEC[1] starts at bit 13. The hash value for CID 21 is 18. These steps are consistent with original PHVEC calculations. In an embodiment, the MEPH adds the novel step of, instead of returning 18 to the user, it counts the number of set bits (i.e., 1's) in the bit vector before bit 18. This is equal to 14 in the example of FIG. 10A. This means that 14 positions are occupied by other keys. Therefore it can use position 14 for CID 21. The previous bit positions are 0, 1, 2, 3, ... 13. Thus, the MEPH process goes a little further by using a faster lookup table for the bit position, as explained below.

In an embodiment, process 120 implements a counting function with the help of a look-up table. As explained above, the bitmap stores the mapping as generated by the perfect hash function. In every lookup, the process needs to count the number of bits set in the bitmap before the bit position returned by the perfect hash function. In order to speed up this operation, the process maintains a lookup table. The lookup table is built during the creation of perfect hash function, and contains the count of number of bits set in every 128-bit block in the bitmap. Process 120 also maintain a cumulative count of the number of entries processed until the current bucket in bucket descriptor. Bucket 0 will have a cumulative count of 0 always, since there are no entries processed before bucket 0. For the example above, bucket 1 will have a cumulative count of 9, since first bucket has 9 entries and so on.

Figure 10B:
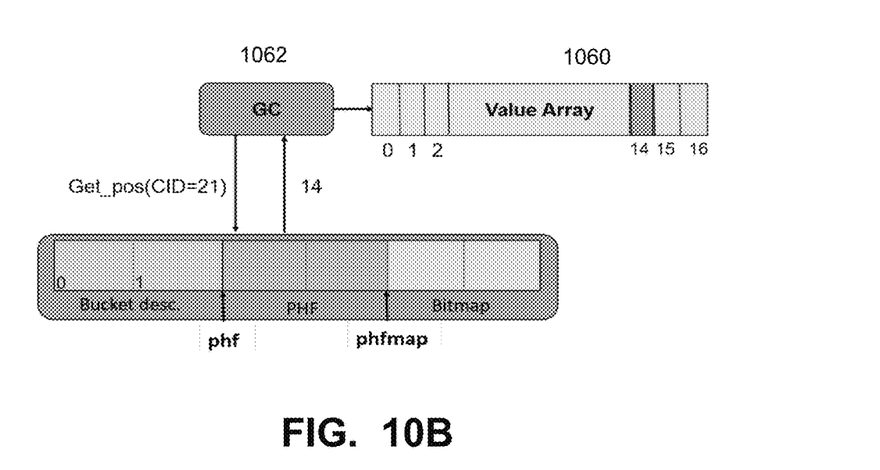
FIG. 10B illustrates the return of a count to a caller as the index of a value array for the example of FIG. 10A, under an embodiment.

FIG. 10B illustrates return the count to the caller as the index of the value array, for the example of FIG. 10A, under some embodiments. As shown in diagram 1020, once the MEPH process gets the actual position, it counts the number of bits set (1's) until that position and returns the count to the caller as the index of the value array 1060. The caller maintains the value as an array and MEPH provides the index in the array associated with the key. The garbage collection process 1062 illustrates an example application that uses this returned count. For this process, there several factors to take into account. First is the cumulative count, which gives the number of entries processed until this bucket. The number of bits set until the current bucket in bitmap is always equal to the cumulative count. The process does not have to worry about the bits in bitmap that are used by the previous buckets as it directly gets the count. Thus, it only needs to count the number of bits set for the bits that belong to current perfect hash bucket. The second factor is the first 128-bit block of the bucket. Since the bit-vector is not word aligned, the cumulative count might include some bits in the first block of the current perfect hash bucket. The process needs to subtract that from the count that is obtained from the lookup table for this block. The third factor is the other blocks before the bit position that belongs to the current bucket. For all the other blocks except first and the last, the process gets the count from the lookup table and add it. The fourth factor is the last 128-bit block that contains the bit returned by perfect hash. Since the position returned by the perfect hash can be any bit in the last block, the process cannot use the entry in the lookup table for this. So, for the last block, it manually computes the number of bits set before the bit position returned by the perfect hash function and add it to the count.

Figure 11:
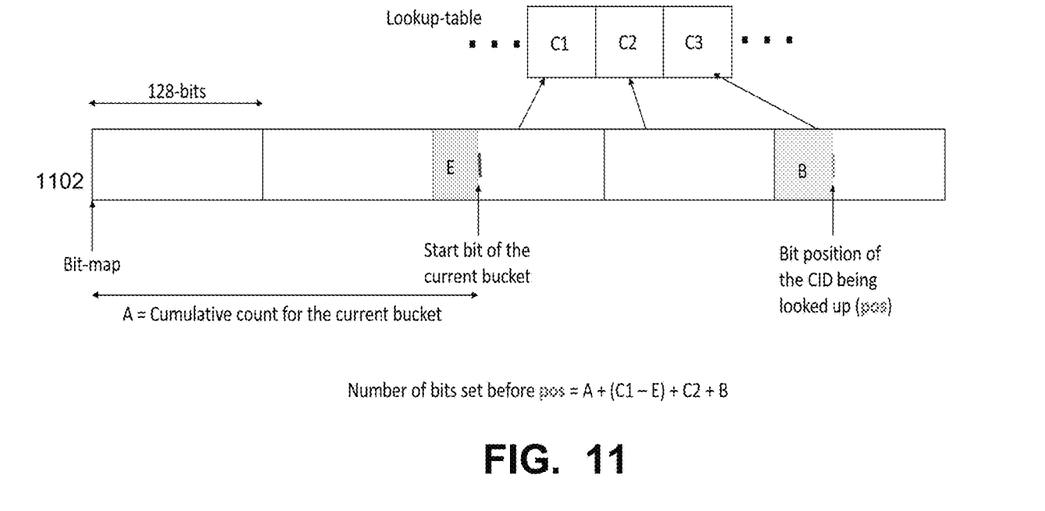
FIG. 11 illustrates implementing a counting function with the help of a lookup table, under some embodiments.

FIG. 11 illustrates implementing a counting function with the help of a lookup table, under some embodiments. As shown in FIG. 11, the bitmap 1102 represents the bit positions from the original PHVEC, hence it is sparse and contains 0's and 1's. The MEPH process counts the number of 1's to transform the hash values. For example, the original PHVEC hash function returns a bit position of 530. Though it is possible to simply count the total # of bits before bit position 530 to get the hash value for MEPH, this is obviously very slow if the bit position gets bigger. The MEPH process optimizes as follows: after the PHVEC functions have been generated, it keeps track of the number of bits set before each PHVEC[k]. For example BIT_B4_PHVEC[0]=0 (always), BIT_B4_PHVEC[1]=264, BIT_B4_PHVEC[2]=560, etc. Therefore, it knows the starting (MEPH) hash value of each PHVEC bucket, which will be BIT_B4_PHVEC[k]. It also keeps track of the total number of 1's in each 128 bit component of the bitmap. This is referred to as BITS[0], BIT2[1], etc. Using the same CID=21 as in the example FIG. 10A, suppose it is mapped to PHVEC[1], and it has computed that the hash value for CID 21 should be 530. The MEPH process finds out the number of bits set before 530 very quickly. Recall that the original PHVEC also provides the starting bit position of each PHVEC[k]. This is not BIT_B4_PHVEC, but rather is called BIT_PHVEC[k]. A simple optimization would be: go to bit position BIT_PHVEC[k] and count the number of bits set before bit position 530 (the hash value for CID 21); then add this number to BIT_B4_PHVEC[1] and it will have the MEPH hash value for CID 21. A further optimization can be done since the total number of bits BITS[k] is known. As shown in FIG. 11, that will be C1, C2, C3. It is not necessary to count every bit. The process can simply add up C1, C2, C3. The only problem is the two boundary 128 bit words. It cannot simply use the counter BITS[k] as it might start in the middle of C1 and end in the middle of C3. For those two cells, the process must do a count. It can do (C1−E) if it counts the number of bits before the starting position or it can simply count the number of bits starting at our start position. For the last cell, it just counts the number of bits before the ending position. For all other 128 bit words in between, it can add up BITS[k].

The MEPH process helps reduce memory requirements for perfect hashing of large records. The actual memory savings depends on many factors, such as system configuration, data traffic, and so on. In one example implementation, the memory overhead per key in the MEPH process 120 is as follows:

PHF: 10-bits per internal bucket. h0 maps an average of 7 keys per internal bucket.
Memory for:PHF per key=10/7=1.43 bits;
Bit-map: Number of bits=1.43*nkeys;
Bits per key for bitmap=1.43 bits;
Bucket Descriptor: 48 bytes per perfect hash function (PHF) bucket.
Average number of keys per PHF bucket=16K;
Bits per key for bucket descriptor=(48*8)/16K=0.024 bits;
Mapping table: 8 bytes per CID RANGE_SIZE. On an average for a sparse container set,
Bits per key for mapping table=0.04 bits;
Lookup table: 8-bits per 128 keys; Bits per key for lookup table=8/128=0.0625;

Total number of bits per key=1.43+1.43+0.024+0.04+0.0625=2.987 bits.

The numbers provided above are intended to be for example only, and embodiments are not so limited.

System Implementation

Embodiments of the processes and techniques described above can be implemented on any appropriate backup system operating environment or file system, or network server system. Such embodiments may include other or alternative data structures or definitions as needed or appropriate.

Figure 12:
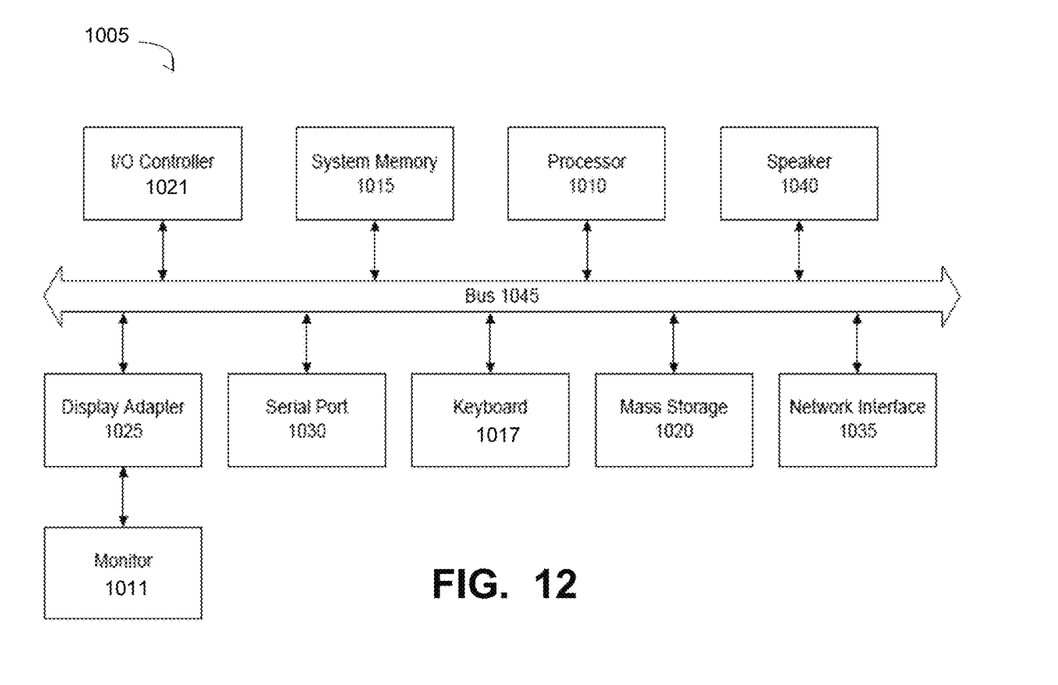
FIG. 12 is a system block diagram of a computer system used to execute one or more software components of the MEPH process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 12 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented memory efficient perfect hashing method for use with large records in a deduplication backup system, comprising:
    dividing a container identifier (CID) set into multiple fixed range sizes of a plurality of ranges;
    mapping the ranges into a first set of perfect hash buckets until each bucket is filled to uniformly distribute the container identifiers (CIDs) across a second set of perfect hash buckets so that the number of CIDs in each perfect hash bucket is the same;
    creating an individual perfect hash function for each perfect hash bucket, and implemented using a compress, hash, displace (CHD) algorithm using two levels of hash functions;
    mapping, for CIDs as keys, n keys to n positions to reduce extra memory usage;
    dividing, using level 1 hash functions, the keys into multiple internal buckets with a defined average number of keys per bucket;
    iteratively trying different level 2 hash variables until collision-free mapping is achieved, wherein the level 2 hash is expressed as: $((h1+h2)*d0+d1)\%$ phf_range, and further wherein the phf_range comprises a function that maps m positions for n keys based on a number of storage bits and an average number of keys per bucket, and a load factor;
    computing a range index of the CIDs;
    using the range index value to derive the index of the mapping table to lookup, wherein the range index value in the mapping table comprises the perfect hash bucket index;
    using the perfect hash bucket index to obtain an offset of the perfect hash function and the bitmap for the bucket;
    reading a function at the offset specified in the bucket descriptor and applying the function to the key to get a position from the perfect hash function;
    counting the number of bits set until that position; and
    returning the count of the number of set bits to the caller as an index of the value array.

2. The method of claim 1 wherein 10-bits are used to store a (d0+d1*phf_range) value and the average number of keys per bucket is 7 so that the phf_range comprises the value m=1.43n and the load factor is 0.7.

3. The method of claim 2 further comprising:
    storing the final variable values achieving the collision-free mapping in a bucket descriptor; and
    storing the d0 and d1 values are stored in compressed form as the value: d0+d1*phf_range.

4. The method of claim 1 wherein the caller maintains the value as an array, and wherein the method further comprises providing the index in the array associated with the key.

5. The method of claim 4 wherein the position is relative to the keys present in the current bucket, the method further comprising adding the bit offset, which specifies the start-bit for the bucket to get an actual position in the bitmap.

6. The method of claim 5 wherein the range index is computed as Range_Index=(CID−min_CID)/Range_Size.

7. A system implementing memory efficient perfect hashing method for use with large records in a deduplication backup system, comprising:
    a first processing component dividing a container identifier (CID) set into multiple fixed range sizes of a plurality of ranges, and mapping the ranges into a first set of perfect hash buckets until each bucket is filled to uniformly distribute the container identifiers (CIDs) across a second set of perfect hash buckets so that the number of CIDs in each perfect hash bucket is the same;
    a second processing component creating an individual perfect hash function for each perfect hash bucket and implemented using a compress, hash, displace (CHD) algorithm using two levels of hash functions, and mapping, for container IDs as keys, n keys to n positions to reduce extra memory usage;
    a third processing component dividing, using level 1 hash functions, the keys into multiple internal buckets with a defined average number of keys per bucket, and iteratively trying different level 2 hash variables until collision-free mapping is achieved, wherein the level 2 hash is expressed as: $((h1+h2)*d0+d1)\%$ phf_range, and further wherein the phf_range comprises a function that maps m positions for n keys based on a number of storage bits and an average number of keys per bucket, and a load factor;
    a fourth processing component looking up a specific container identifier by:
    computing a range index of the CIDs;
    using the range index value to derive the index of the mapping table to lookup, wherein the range index value in the mapping table comprises the perfect hash bucket index;
    using the perfect hash bucket index to obtain an offset of the perfect hash function and the bitmap for the bucket;
    reading a function at the offset specified in the bucket descriptor and applying the function to the key to get a position from the perfect hash function;
    counting the number of bits set until that position; and
    returning the count of the number of set bits to the caller as an index of the value array.

8. The system of claim 7 wherein 10-bits are used to store a (d0+d1*phf_range) value and the average number of keys per bucket is 7 so that the phf_range comprises the value m=1.43n and the load factor is 0.7.

9. The system of claim 8 further comprising a fifth processing component storing the final variable values achieving the collision-free mapping in a bucket descriptor; and storing the d0 and d1 values are stored in compressed form as the value: d0+d1*phf_range.

10. The system of claim 7 wherein the caller maintains the value as an array, and wherein the method further comprises providing the index in the array associated with the key.

11. The system of claim 10 wherein the position is relative to the keys present in the current bucket, the method further comprising adding the bit offset, which specifies the start-bit for the bucket to get an actual position in the bitmap.

12. The system of claim 11 wherein the range index is computed as Range_Index=(CID−min_CID)/Range_Size.

13. A computer program product, comprising a non-transitory computer-readable medium having a computer-readable program code embodied therein, the computer-readable program code adapted to be executed by one or more processors to implement a memory efficient perfect hashing method for use with large records in a deduplication backup system, by:

dividing a container identifier (CID) set into multiple fixed range sizes of a plurality of ranges;

mapping the ranges into a first set of perfect hash buckets until each bucket is filled to uniformly distribute the container identifiers (CIDs) across a second set of perfect hash buckets so that the number of CIDs in each perfect hash bucket is the same;

creating an individual perfect hash function for each perfect hash bucket, and implemented using a compress, hash, displace (CHD) algorithm using two levels of hash functions;

mapping, for CIDs as keys, n keys to n positions to reduce extra memory usage; and dividing, using level 1 hash functions, the keys into multiple internal buckets with a defined average number of keys per bucket;

iteratively trying different level 2 hash variables until collision-free mapping is achieved, wherein the level 2 hash is expressed as: ((h1+h2)*d0+d1)% phf_range, and wherein the phf_range comprises a function that maps m positions for n keys based on a number of storage bits and an average number of keys per bucket, and a load factor;

computing a range index of the CIDs;

using the range index value to derive the index of the mapping table to lookup, wherein the range index value in the mapping table comprises the perfect hash bucket index;

using the perfect hash bucket index to obtain an offset of the perfect hash function and the bitmap for the bucket;

reading a function at the offset specified in the bucket descriptor and applying the function to the key to get a position from the perfect hash function;

counting the number of bits set until that position; and returning the count of the number of set bits to the caller as an index of the value array.

14. The computer program product of claim 13 wherein 10-bits are used to store a (d0+d1*phf_range) value and the average number of keys per bucket is 7 so that the phf_range comprises the value m=1.43n and the load factor is 0.7.

* * * * *